(12) United States Patent  
Ueoka (10) Patent No.: US 9,881,514 B2  
(45) Date of Patent: Jan. 30, 2018

(54) DISPLAY DEVICE FOR PRACTICE OF KEYBOARD INSTRUMENT DIAGRAMMED WITH BLACK KEYS AS MARKERS

(71) Applicant: Hayato Ueoka, Tokyo (JP)

(72) Inventor: Hayato Ueoka, Tokyo (JP)

( * ) Notice: Subject to any disclaimer, the term of this patent is extended or adjusted under 35 U.S.C. 154(b) by 15 days.

(21) Appl. No.: 15/033,047

(22) PCT Filed: Oct. 29, 2014

(86) PCT No.: PCT/JP2014/078731  
§ 371 (c)(1),  
(2) Date: Nov. 21, 2016

(87) PCT Pub. No.: WO2015/064623  
PCT Pub. Date: May 7, 2015

(65) Prior Publication Data  
US 2017/0132945 A1    May 11, 2017

(30) Foreign Application Priority Data  
Oct. 31, 2013   (JP) ................................. 2013-226999

(51) Int. Cl.  
*G09B 15/02* (2006.01)  
*G10G 1/02* (2006.01)

(52) U.S. Cl.  
CPC ............... *G09B 15/02* (2013.01); *G10G 1/02* (2013.01)

(58) Field of Classification Search  
CPC .................................. G09B 15/02; G10G 1/02  
See application file for complete search history.

(56) References Cited

U.S. PATENT DOCUMENTS

| 104,393 A | 6/1870 | Wright |
| 1,473,495 A * | 11/1923 | Miller ................... G09B 15/00 84/428 |

(Continued)

FOREIGN PATENT DOCUMENTS

| JP | 49-52653 U | 5/1974 |
| JP | 49-96058 U | 8/1974 |

(Continued)

OTHER PUBLICATIONS

International Search Report dated Feb. 3, 2015, issued in corresponding International Application No. PCT/JP2014/078731, filed Oct. 29, 2014, 6 pages.

*Primary Examiner* — Robert W Horn  
(74) *Attorney, Agent, or Firm* — Christensen O'Connor Johnson Kindness PLLC (57) ABSTRACT

In the present invention, images of a keyboard can be efficiently input into a learner's brain by using a display device in which two kinds of parallel black keys on a keyboard instrument are diagrammed as marker figures which are a substantially n-shaped figure and a substantially m-shaped figure, and the positions of pressed keys are plotted onto the marker figures. The display device can be configured using, for example, printed matter (e.g., a sheet or a card), a font set, an electronic display, and a three-dimensional object, and is provided as a sheet for writing music, performance or practice sheet music, learning cards, or a three-dimensional mimic keyboard. Altogether, provided is a novel music education method based on the images of a keyboard.

5 Claims, 5 Drawing Sheets (A)

(B)

(56) References Cited

U.S. PATENT DOCUMENTS

| | | | |
|---|---|---|---|
| 2,157,168 A | 5/1939 | Fine | |
| 2,984,142 A * | 5/1961 | McGinley | G10G 1/00 84/471 R |
| 6,476,303 B1 * | 11/2002 | Mutou | G09B 15/026 84/483.1 |
| 6,987,220 B2 * | 1/2006 | Holcombe | G09B 15/026 84/483.2 |
| 7,439,438 B2 | 10/2008 | Hao | |
| 7,767,895 B2 * | 8/2010 | Johnston | G09B 15/02 84/470 R |
| 8,835,737 B2 * | 9/2014 | King | G09B 15/023 84/471 R |
| 2017/0132945 A1 * | 5/2017 | Ueoka | G09B 15/02 |

FOREIGN PATENT DOCUMENTS

| | | |
|---|---|---|
| JP | 55-77263 U | 5/1980 |
| JP | 09-218639 A | 8/1997 |
| JP | 2000-338972 A | 12/2000 |
| JP | 2004-199010 A | 7/2004 |
| JP | 4178813 B2 | 9/2008 |

\* cited by examiner

DISPLAY DEVICE FOR PRACTICE OF KEYBOARD INSTRUMENT DIAGRAMMED WITH BLACK KEYS AS MARKERS

TECHNICAL FIELD

The present invention relates to a display device for assisting the practice of playing a keyboard instrument, in particular, the piano.

BACKGROUND ART

Many learners of a keyboard instrument, which is represented by the piano, try to memorize a piece of music and repeat practice, so that the piece of music will be in their repertoire.

Memorizing sheet music means that information on how to play a piece of music is input into the brain of a player. Usually, the player reads sheet music and converts it to information about the positions of pressed keys on a keyboard. Then, the player repeats the practice. In this process, the player's memory is fixed as fingering patterns. That is, it is regarded that memorizing sheet music equals the memory of the fingering patterns. Of course, this process entails the memory of sound. However, most of the learners are striving to practice specializing in the memory of finger movement such as "aim the state where the finger arbitrarily plays the tune without consciousness.

Here, memorizing sheet music can be achieved through various types of memory other than memorizing the fingering patterns. Among them, ear memory and eye memory play a big role. The ear memory refers to memorizing tones of a piece of music. For example, this memory is characterized in that "the music can be replayed from the beginning to the end in the player's brain". Meanwhile, the eye memory involves "how to move the fingers". In addition, the eye memory also involves "which keys on a keyboard are pressed?", "how do notes progress in sheet music?", and so on. Of course, examples of the other memories also include various body (e.g., posture, touch) memories and memory regarding the player's emotions expressed as music progresses.

Unfortunately, in current piano education, a difference in quality of information about these memories is not taken into account. The information input used to memorize sheet music relies on simply repeating the practice of fixing fingering patterns in the player's brain. Thus, a way in which to memorize music efficiently tends to depend on a way of the burden to translate an easy music score for beginners into positions of keys to press. The main purpose of most of the existing inventions with respect to the learning of piano is to "help beginners, who cannot read sheet music, memorize fingering patterns and then sheet music", which is about the origin of the above idea and is reflected in the above strategy.

For example, in Patent Literature 1, there is provided a display device for displaying a performance guide for indicating the positions of pressed keys directly on a keyboard instrument and for indicating which fingers should be used. This display device allows a player to avoid a process for reading sheet music in order to memorize it. Accordingly, the player can only make the practice of fixing fingering patterns in the brain so as to memorize the sheet music. This procedure requires a specialized keyboard instrument and ready-to-use music data, and is thus not in universal use. According to Patent Literature 2, a keyboard diagram is presented and can then be used to instruct which fingers of a player should be moved while the player does not have to image sheet music. Except for less difficult introductory music in which there are a smaller number of notes, the diagram expression is difficult, so that a heavy burden of reading it is imposed on learners.

Meanwhile, a device of sheet music is provided in which a keyboard is displayed as a pitch diagram, and plotted, pressed-key instructions, as they are, can be visually projected on the keyboard. This device originates from a play information-recording system called a piano roll for automatic playing pianos and organs that were devised at the end of the 19th century.

The keyboard of a keyboard instrument, in general, consists of black keys and white keys. The arrangements of the keys are different between the anterior surface and the posterior surfaces of the keyboard. Only the white keys are arranged on the anterior surface of the keyboard, and this arrangement involves the diatonic scale of C major. This corresponds to conventional staff notation, which is a pitch diagram of the diatonic scale.

By contrast, the white and black keys are arranged on the posterior surfaces of the keyboard with half-tone intervals, and the structure was arranged in a linear and balanced manner. This arrangement represents a chromatic scale from the viewpoint of music. Here, piano roll sheet music, in which a piano roll is simulated, is a pitch diagram of the chromatic scale corresponding to that on the posterior surfaces of the keyboard.

The inventions disclosed in, for example, Patent Literatures 3, 4, and 5 are configured just as pitch diagrams of the chromatic scale. Learners can look at sheet music based on the above piano roll and can just identify the diagrammed positions of pressed keys. Many pieces of music, however, consist essentially of notes of the diatonic scale. In the piano roll sheet music, for example, in a piece of music in C major, the displayed area of a black key, which represents a non-diatonic note, can be spared. In addition, because the black keys and the white keys deployed as bands or grids of individual keys (pitches) in the piano roll sheet music are visually distinct, the positions of pressed keys can be identified mechanically (instinctively). The chromatic sheet music includes many figurative elements such as background lines. Consequently, there is a disadvantage in which visual complexities occurring when a player reads the sheet music while comparing with the actual keyboard become a burden. Further, note values (i.e., the length of a note) may each be expressed as the length of a symbol indicating the position of a pressed key. In this case, this expression is more complicated along the time axis than that of conventional staff notation. Nowadays, the piano roll sheet music is often employed for a screen for inputting, into a machine (e.g., information devices such as a personal computer), and checking play information as computer music. This is because an overlooked view of the status of tone is better than that of the staff notation. Hence, the piano roll sheet music is suited for checking the mechanical replay of the music. That is, the piano roll sheet music is basically suited for machines (automatic playing pianos) because of its origin. For humans, that is too much burden.

Patent Literatures 6 and 7 provide chromatic sheet music. A method for indicating a pitch position includes using only lines indicating the positions of black keys. The visual complexities of the piano roll sheet music are considerably resolved. However, because the black keys are depicted as abstract images, namely, lines, it is emphasized that pitch is arranged on a linear diagram. Accordingly, when the diagram is read as an image of an actual keyboard, a player cannot instinctively transform the diagram into the visual image of the keyboard. Further, when there are many notes played, it is difficult to visually memorize sheet music. Consequently, the player has to repeatedly look at the sheet music and the keyboard. That is, except for music for beginners, the visual reading has a little use.

In this way, as a means for inputting sheet music information into the player's brain, it cannot be said that the chromatic sheet music (e.g., current piano roll sheet music) is significantly better than the conventional staff notation used during practice. Besides, the players cannot do without the practice of fixing fingering patterns in their brain The practice of fixing fingering patterns in the player's brain has an intrinsic problem. The player is likely to fall into the situation in which "when the player is confused while playing memorized music, the player cannot remember the next note unless the music is replayed from the beginning". The practice should also be supported by tone memory. The tone memory is actually a secondary one accompanied by the fingering memory. Thus, the player readily falls into a situation in which every time the player is stuck during performance, the player has no other option than to repeat the fixed fingering patterns from the beginning. Of course, in the case of the learners who have acquired the superior ability to read sheet music, the practice is also supported by the visual memory of the sheet music and the tone memory conceived therefrom. Hence, the above situation hardly occurs. However, most of the learners tend to concentrate on the practice of memorizing sheet music primarily through the training of fingering after memorizing the sheet music rather than educate their ability to read sheet music. Thus, the practice does not result in a sufficient ability to read sheet music.

The quality of the memory, by itself, often involves the case where when memorizing sheet music relies on the fingering memory, "the player cannot reproduce the fingering patterns just in the brain". That is, the fingering memory is nothing but the memory that cannot be remembered unless the player actually sits in front of a musical instrument. The main cause of this phenomenon is explained such that images of a keyboard are not grasped by "the mind's eye", a term defined in cognitive psychology. The keyboard is recognized only as the background of the player's fingers. Accordingly, unless there is a situation in which the player faces the piano and sees the keyboard as the actual background, the player cannot replay the fingering patterns.

Here, the images of a keyboard may be retained in the player's brain. In this case, the player can have a strong visual memory configured such that "the player can beforehand and consciously grasp the sequence of the positions of pressed keys that should be touched", but not the simple fingering memory that is sequentially retrieved such that "one movement is followed by another movement". In addition, the player can easily learn the visual relationship between the conventional sheet music and the keyboard. This helps the player improve the ability to read sheet music. Further, the tone memory may be connected to the images of a keyboard, so that the player can retain the tone memory as a stronger retrievable memory. The closer various types of information are connected to one another, the stronger memory information the player can retain and retrieve (reproduce). The images of a keyboard become a core element.

Specifically, in piano education, there is a need for a means for enabling a learner to efficiently acquire "keyboard images that can be actively retrieved by the learner".

CITATION LIST

Patent Literature

Patent Literature 1: JP-A-2000-338972
Patent Literature 2: JP-A-H09-218639
Patent Literature 3: U.S. Pat. No. 2,157,168
Patent Literature 4: U.S. Pat. No. 7,439,438
Patent Literature 5: U.S. Pat. No. 7,767,895
Patent Literature 6: U.S. Pat. No. 104,393
Patent Literature 7: U.S. Pat. No. 1,473,495

SUMMARY OF INVENTION

Technical Problem

The purpose of the present invention is to provide a device for enabling a learner to retain, in the learner's brain, an actively retrievable, strong image of a keyboard as well as to provide a technology that makes it possible to train a learner to memorize and retrieve, on the basis of the device, visual and spatial information about the positions of pressed keys during performance.

Solution to Problem

The present inventor has found out that the above objectives can be resolved such that two kinds of parallel black keys on a keyboard instrument are diagrammed as marker symbols which are a substantially n-shaped symbol and a substantially m-shaped symbol, and the positions of pressed keys are plotted onto the marker symbols. Then, the present invention has been completed.

Specifically, an aspect of the present invention provides a display device for displaying, as markers, diagrammed black keys of a keyboard instrument, comprising: a substantially n-shaped symbol that is expressed as a marker for indicating positions of five keys of C, C#, D, D#, and E; and a substantially m-shaped symbol that is expressed as a marker for indicating positions of seven keys of F, F#, G, G#, A, A#, and B, wherein the substantially n-shaped symbol and the substantially m-shaped symbol are alternately arranged with an interval in accordance with an arrangement of black keys of a keyboard instrument to display a desired pitch range, and wherein the positions of pressed keys are each plotted on a leg portion of the n-shaped symbol or the m-shaped symbol or a ground portion adjacent to the leg portion.

In addition, the display device with the above features may be configured such that when the pitch range displayed exceeds one octave, octaves are differentially displayed such that sets, each constituting an octave and containing the substantially n-shaped symbol and the substantially m-shaped symbol, are displayed in two different colors and/or at different levels of gray scale and are arranged alternately. Also, when the pitch range displayed by the display device includes a middle C, a mark may be added, next to the substantially n-shaped symbol, at a position of the middle C or a height, width, and/or design of the n-shaped symbol are modified and distinguishable.

Further, the display device with the above features may be configured such that a pressed-key mark which indicates a position of a pressed black key and a pressed-key continuation mark which indicates that a state of the pressed black key continues are plotted on any of two lines each representing a leg portion of the substantially n-shaped symbol or on any of three lines each representing a leg portion of the substantially m-shaped symbol; a pressed-key mark which indicates a position of a pressed white key and a pressed-key continuation mark which indicates that a state of the pressed white key continue are plotted on a ground portion adjacent to the leg portion; the pressed-key marks are expressed as symbols, numerical characters, or symbols, a display style of which is different between a left hand and a right hand; a length of the leg portions of the substantially n-shaped symbol or the substantially m-shaped symbol is extended depending on the number of the pressed-key marks plotted; a connection line which stresses that keys are pressed simultaneously and/or an auxiliary line which stresses a flow of a phrase are added; and a symbol element, such as a segment line, parentheses, and a line box, for visually indicating a phrase segment and/or an assembly of phrases is added.

Furthermore, another aspect of the present invention provides a card and a set containing the cards, comprising a card on which black keys are diagrammed as markers in accordance with the above display device, wherein a position of a key pressed on a keyboard is displayed on a front face of the card in a manner displayed by the above display device; a note name, chord name, scale name, and/or sheet music, for example, that correspond to the display on the front face are displayed on a back face of the card.

Moreover, still another aspect of the present invention provides a method for practice of a keyboard instrument, comprising using a display device for displaying a keyboard image in which black keys of a keyboard instrument are diagrammed as markers, wherein the display device is the above-described display device.

Advantageous Effects of Invention

The present invention allows for training in which since a leaner is at the initial stage of learning a keyboard instrument, strong images of a keyboard can be burned into the learner's brain. The positions of pressed keys can be identified from sheet music. Then, the positions of pressed keys can be memorized and retrieved (recalled). In all the processes, the learner can learn without relying on fingering memory. Here, the strong keyboard images as so obtained can be the foundation for development of skills in various aspects of the learning of keyboard instruments, characterized in that images of notes of sheet music and a keyboard can be reinforced to improve the ability to read the sheet music; the positions of pressed keys can be memorized and retrieved on the basis of the images of a keyboard to improve the ability to memorize sheet music; patterns of chords and scales on a keyboard can be easily memorized, so that the understanding of music in view of tonality, etc., is deepened; pitches and the images of a keyboard can be connected naturally, which promotes ear training; and so on.

DESCRIPTION OF EMBODIMENTS

First, the present invention is effective in all keyboard instruments such as the piano. Hereinafter, the present invention will be described using the piano as a representative example of the keyboard instruments. As used herein, the terms "white key" and "black key" are named in accordance with the painted colors of the keys of modern pianos. Specifically, the white keys refer to the keys of the C major diatonic scale. The black keys refer to keys other than the above.

With reference to the drawings, embodiments of the present invention are described below in detail.

Figure 1:
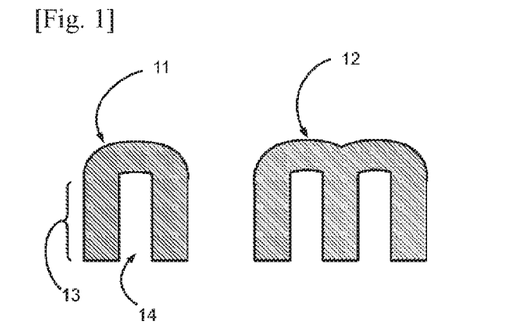
FIG. 1 is an example of symbols having black keys diagrammed as markers according to an embodiment of the present invention.

In FIG. 1, parallel black keys are diagrammed as a substantially n-shaped symbol 11 and a substantially m-shaped symbol 12. These two kinds of a marker symbol are used to specify the geographical location of the keys on a keyboard in accordance with the essence of the present invention. The parallel black keys are diagrammed as easy-to-recognize symbols. The individual key positions are each represented as a position relative to the marker symbol. The positions of black keys are each represented by a leg portion 13 of the substantially n-shaped symbol or the substantially m-shaped symbol. The positions of white keys are each represented by a ground portion 14 adjacent to the leg portion.

The substantially n-shaped and m-shaped marker symbols can be instantly input into the brain of any of keyboard instrument learners from beginners to skilled players. They can always recall the symbols when the position of a pressed key comes to their mind. Accordingly, even if a plurality of keys are pressed simultaneously or continuously, this can be expressed as one visual image. Thus, information about the positions of pressed keys can be efficiently input into their brain. In addition, the above can provide a very effective means for maintaining and replaying (retrieving) that memory. This also leads to the ability to retrieve the images of a keyboard from their brain and thus reproduce the play information anywhere anytime without any musical instrument. At the same time, this means that the above technology can not only be used for memorizing a piece of sheet music of their repertoire, but also can deepen their understanding of music (e.g., key, chord) and be utilized as the foundation for their ear training.

Figure 2:
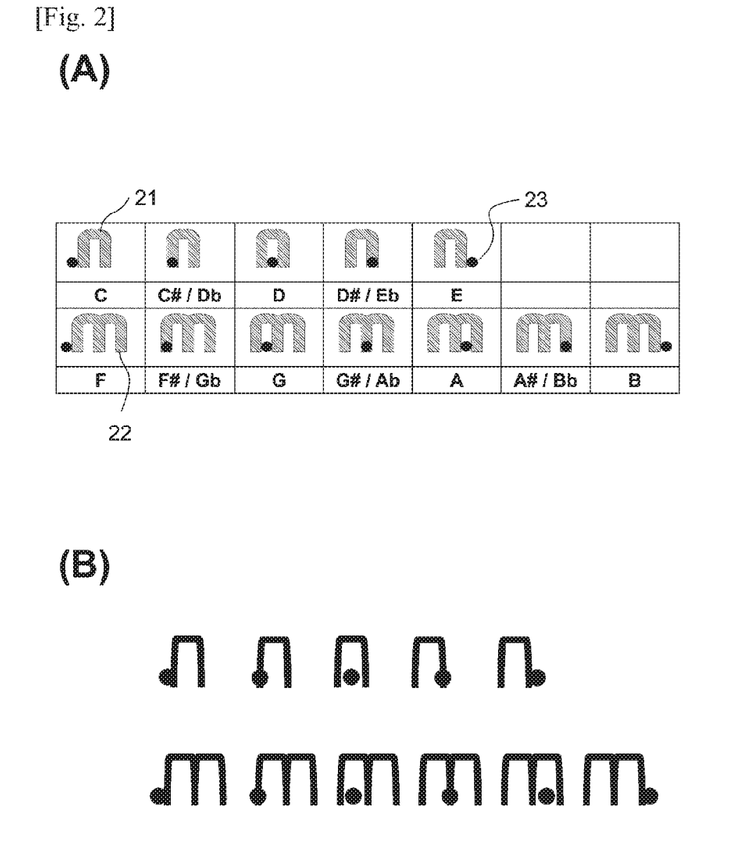
FIG. 2 is an example in which 12 notes on a keyboard are displayed and an example of font designs according to an embodiment of the present invention.

FIG. 2(A) is a table illustrating 12 display examples of the keys of a keyboard instrument in accordance with a display device of the present invention.

The above substantially n-shaped symbols 21 and substantially m-shaped symbols are used as markers. Then, a pressed-key mark 23 indicates a specific position on a keyboard. This display enables 12 different keys to be distinguished from one another. The substantially n-shaped symbols 21 is used when the notes of C, C#, D, D#, and E are plotted. The substantially m-shaped symbol 22 is used when the notes of F, F#, G, G#, A, A#, and B are plotted. The notes with # among the above notes are plotted on the leg portions of the substantially n-shaped and m-shaped marker symbols (21 and 22). The notes without # are the notes of white keys, and plotted on the ground portions adjacent to the leg portions of the above marker symbols.

In this way, the positions of keys pressed on a keyboard are depicted as abstract images and symbolized. It is easily conceivable that within the present invention, such display fonts used in the display device with an electronic display and prints fonts therefor are included in the configuration.

FIG. 2(B) is an example of font designs indicating the positions on a keyboard according to an embodiment of the present invention. The font designs represent 12 characters corresponding to the 12 different notes. All the patterns of how keys are pressed may be expressed using these fonts. For this purpose, the 0 to 5 positions of pressed keys represented in the substantially n-shaped marker symbol are combined to give 32 different sets. Also, the 0 to 7 positions of pressed keys represented in the substantially m-shaped marker symbol are combined to give 128 different sets. That is, the total of 160 character font sets may be used for the configuration.

The fonts and font sets can be exploited as a means for simply expressing the keyboard positions. They are of practical use for the learning of keyboard images involving, in particular, the chord tones and/or the scale tones. In addition, the fonts may be expressed, that is, used as information given as an aid for conventional sheet music such as staff notation.

Figure 3:
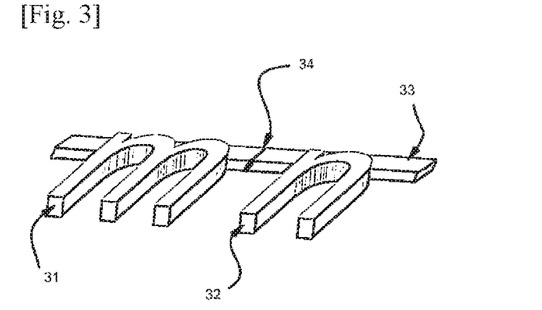
FIG. 3 is an example of a three-dimensional display device according to an embodiment of the present invention.

FIG. 3 is an example when the above marker symbols are embodied as a three-dimensional object.

Kinds of material used for this embodiment are not limited to a specific material. Examples of the material that can be used include various raw materials such as plastics, silicon resins, polyester materials, sponges, wood, cloths, and metals.

A substantially n-shaped part 32 and a substantially m-shaped part 31 are attached to a base part 33. Connecting portions 34 at both ends of the base part 33 can be connected to increase a pitch range at one's will. The connecting portions 34 have detachable forms. However, the same connecting portions on the substantially n-shaped symbol 32 side or the substantially m-shaped symbol 31 side cannot be connected. It is desirable to provide an embodiment such that the parts can only be connected alternately in the order of "(n-m-n-m . . . )".

As shown in FIG. 3, an embodiment of the present invention is three-dimensionally constructed to provide a training and learning guide device specialized in the reinforcement of images of a keyboard in the learner's brain. In other words, one of the purposes is to provide a three-dimensional mimic keyboard such that both visual and touch information about the keyboard can be effectively input into the brain.

The learners would repeat practice of, for example, the scale and/or chord by "plotting" (pressing or touching) the positions of pressed keys on this mimic keyboard by using their fingers. Consequently, the learners can make vivid spatial images of the keyboard in their brain. This leads to the promotion of the ability to play music almost without looking at a keyboard and without looking aside from sheet music when the learners read the sheet music (play music while reading the sheet music). In addition, when this mimic keyboard is used for practice, "no sound is generated". This feature exerts an effect in which the learner's concentration directed toward the touch of a finger is increased. Thus, the learners can reinforce the training of recalling tones from their own brain, that is, can actively reinforce their ear sensitivity for pitches.

Figure 4:
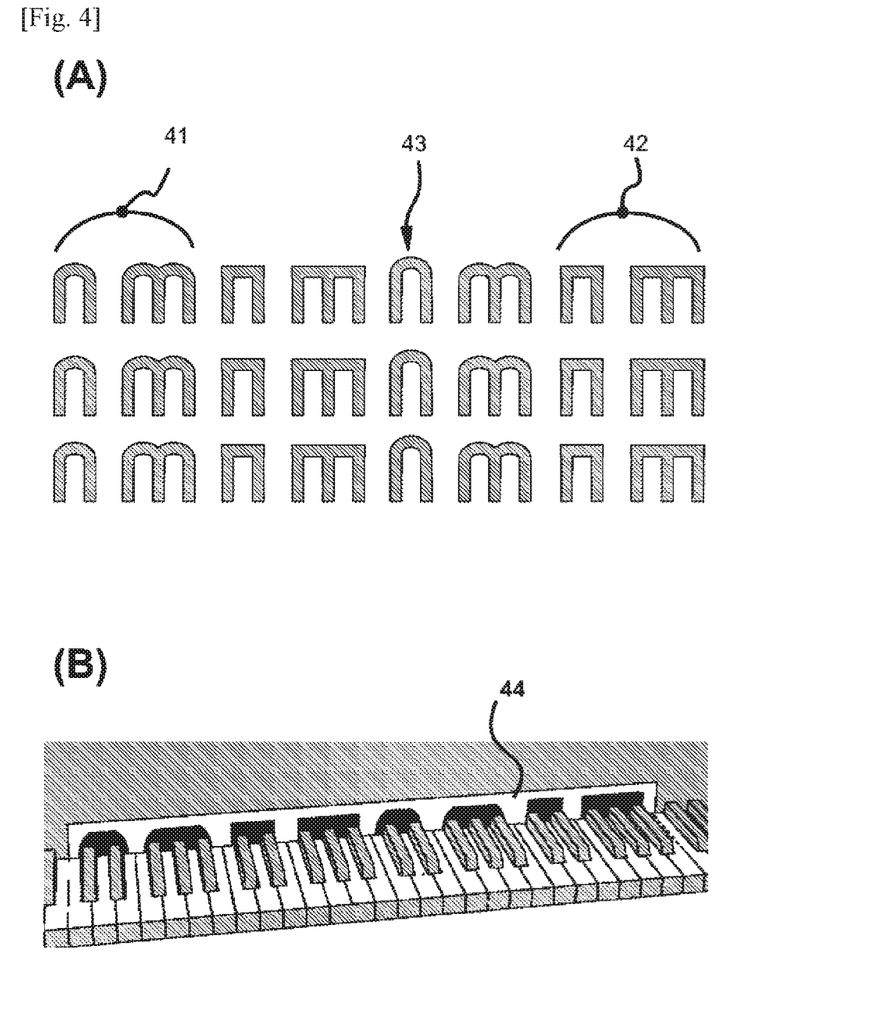
FIG. 4 is an example of a sheet for writing music and an example of a keyboard panel using a display device according to an embodiment of the present invention.

FIG. 4(A) is a display example when the display device according to an embodiment of the present invention is put into practice as a sheet for writing music for keyboard instruments. Basically, marker symbol sets (41 and 42) containing the substantially n-shaped and m-shaped symbols can be used to write music with respect to all the 12 notes included in one octave. Then, only a desirable pitch range may be arranged in this way. In the embodiment of FIG. 4(A), the set 41 includes a substantially n-shaped symbol with a round top design and a substantially m-shaped symbol and the set 42 includes a substantially n-shaped symbol with a squared design and the substantially m-shaped symbol. These sets are arranged alternately. This visual difference causes one octave to be easily distinguishable from the next octave. Note that the visual difference between the octaves herein can be expressed not only as the shape difference, but also by using different colors and/or different levels of gray scale. The present invention is thus not limited to this embodiment.

In addition, to indicate the center of a keyboard, the height of the substantially n-shaped symbol 43 including the middle C of the keyboard is increased to give a visual distinction. This visual difference indicating the center position of the keyboard may be expressed not only as the shape difference, but also by using different colors and/or different levels of gray scale. Alternatively, a figurative element such as a specific symbol may be added for the expression. The present invention is thus not limited to this embodiment.

Rows including the sets (41 and 42) composed of the substantially n-shaped and m-shaped symbols with the above features are displayed repeatedly (here, only 3 rows are shown) in a vertical direction. This enables the positions of keys pressed on the keyboard to be recorded continuously and sequentially. This display may be printed on a piece of paper. In this case, a learner can plot (mark) the positions of pressed keys on the substantially n-shaped and m-shaped marker symbols by using a writing tool such as a pencil. In addition, an electronic display device may be used for the display. In this case, an input unit (e.g., a keyboard, mouse, touch panel) connected to the device may be used to plot the positions of pressed keys.

It is important for beginners to instinctively understand the direct visual relationship between a keyboard instrument and the substantially n-shaped and m-shaped marker symbols according to the present invention. For this purpose, a device may be installed such that the black keys of a keyboard instrument used look like the substantially n-shaped and m-shaped symbols. For example, the black keys are provided with an attachment member (e.g., a seal) indicating a line connecting the inner part sides of a two-member parallel black key set and a three-member parallel black key set. In addition, as shown in FIG. 4(B), an approach may be considered in which the inner part side of a keyboard is provided with a panel 44 on which stripes connecting the black keys are drawn. Of course, a keyboard instrument may have prefabricated black keys looking like the substantially n-shaped and m-shaped symbols.

Note that FIG. 4(A) shows the visual difference between the octaves (41 and 42) including the substantially n-shaped and m-shaped symbol set. Use of the difference is not intended to provide a simple aid for the visual understanding of a pitch range. Here, considered is the relationship with the display structure of sheet music using conventional staff notation. For example, the C major scale is considered. Within an octave ascending from the middle C, the C, E, G, and B, note names in staff notation, are expressed as notes on one of staff lines and D, F, and A are expressed as notes located between the staff lines. As terms that represent the visual difference regarding the notes on the sheet music, a term "SEN" refers to a note on a staff line and a term "KAN" refers to a note between staff lines. In this way, the seven notes in the scale (correctly speaking, the diatonic scale) are distinguished and designated. That is the primary principle with respect to expression of a pitch in a staff notation diagram. However, 7 is an odd number and the seven notes are classified into two groups of the "SEN" and "KAN". Accordingly, it is characterized in that the "SEN"–"KAN" relationship with respect to the notes in the scale switches between an octave and the next one. Specifically, when the notes C, E, and G that ascend from the middle C are "SEN" notes, the C, E, and G on the next upper (or lower) octave are the "KAN". The SEN and KAN notes in this conventional staff notation can be distinguished visually. This distinction provides the basis for learners to learn a technique in which the sequence of notes on sheet music is converted to visual images of a keyboard. Specifically, the visual difference between one octave and the next one written on the sheet for writing music of FIG. 4(A) enables the training that makes learners aware of switching from the SEN to the KAN between one octave and the next one in staff notation. This becomes preparatory training in which the learners can learn a technique to efficiently and visually read conventional staff sheet music.

Figure 5:
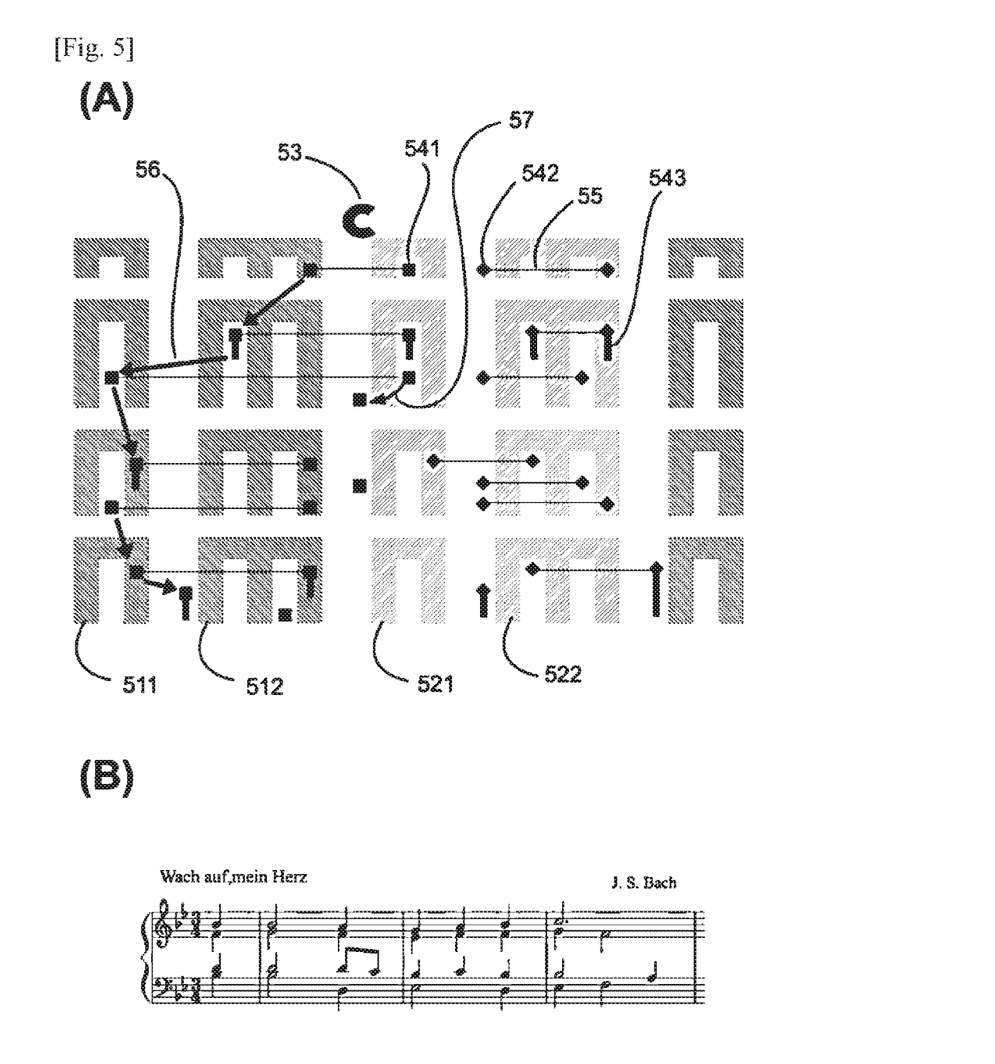
FIG. 5 is an example of sheet music in which a display device according to an embodiment of the present invention is used and corresponding staff notation.

FIG. 5(A) is an embodiment in which the present invention is utilized to configure performance sheet music. In this embodiment, a set composed of a deep-colored substantially n-shaped symbol 511 and a deep-colored substantially m-shaped symbol 512 and a set composed of a light-colored substantially n-shaped symbol 521 and a light-colored substantially m-shaped symbol 522 are arranged by the number of times required for a pitch range of interest. Note that the visual difference between the sets herein is not limited to the difference in the brightness of the color. It is needless to say that types of colors and/or forms may be different.

In addition, a mark 53 is added and displayed near the substantially n-shaped symbol where the middle C is located.

The substantially n-shaped and m-shaped symbols with the above feature are used as marker symbols and arranged per bar in the embodiment of FIG. 5(A). Their units are displayed in a vertical direction in a sequential order corresponding to the temporal order of bars. This means that both ends of a bar are expressed as bank zones.

FIG. 5(B) is conventional staff notation in which the sheet music of FIG. 5(A) is scored and which provides the first part of "Wach auf, mein Herz" composed by Bach. As shown in this sheet music, this piece of music is in three-quarter time and is a chorale in which four voice parts including soprano, alto, tenor, and bass proceed. In FIG. 5(A), this music is just written on the sheet music for keyboard instruments by using black key markers including the substantially n-shaped and m-shaped symbols. The soprano and alto parts should be played using the right hand and the tenor and bass parts should be played by the left hand. For this purpose, the parts played using the left hand are designated using square pressed-key marks 541 and the parts played using the right hand are designated using rhombic pressed-key marks 542. To visually distinguish the parts played using the left hand from ones using the right hand, it is needless to say that embodiments are enabled by using a difference in color in addition to the difference in shape of the pressed-key marks as used herein.

In the sheet music of FIG. 5(A), the length of a tone is not expressed visually. Basically, a quarter note is represented by each pressed-key mark (541 or 542) indicating the left or right hand. In addition, when a pressed-key state continues, this is visually displayed using a pressed-key continuation mark 543. Notes, the tones of which are generated simultaneously, are basically aligned on the same row. Their visibility is increased by adding a horizontal auxiliary line 55 connecting the pressed-key marks. In addition, when an eighth note appears, an auxiliary line 57 connecting the pressed-key marks is added to this portion to express the portion as a short-term phrase flow.

Further, an auxiliary line 56 indicating a phrase flow is added, as needed, in accordance with readability and educational intents. Here, the auxiliary lines 56 enable learners to grasp the flow of the bass voice part as a pattern.

Note that the shapes of the auxiliary lines (55, 56, and 57) indicated herein are not particularly limited to this embodiment as long as the respective auxiliary lines have visually distinguishable forms.

Figure 6:
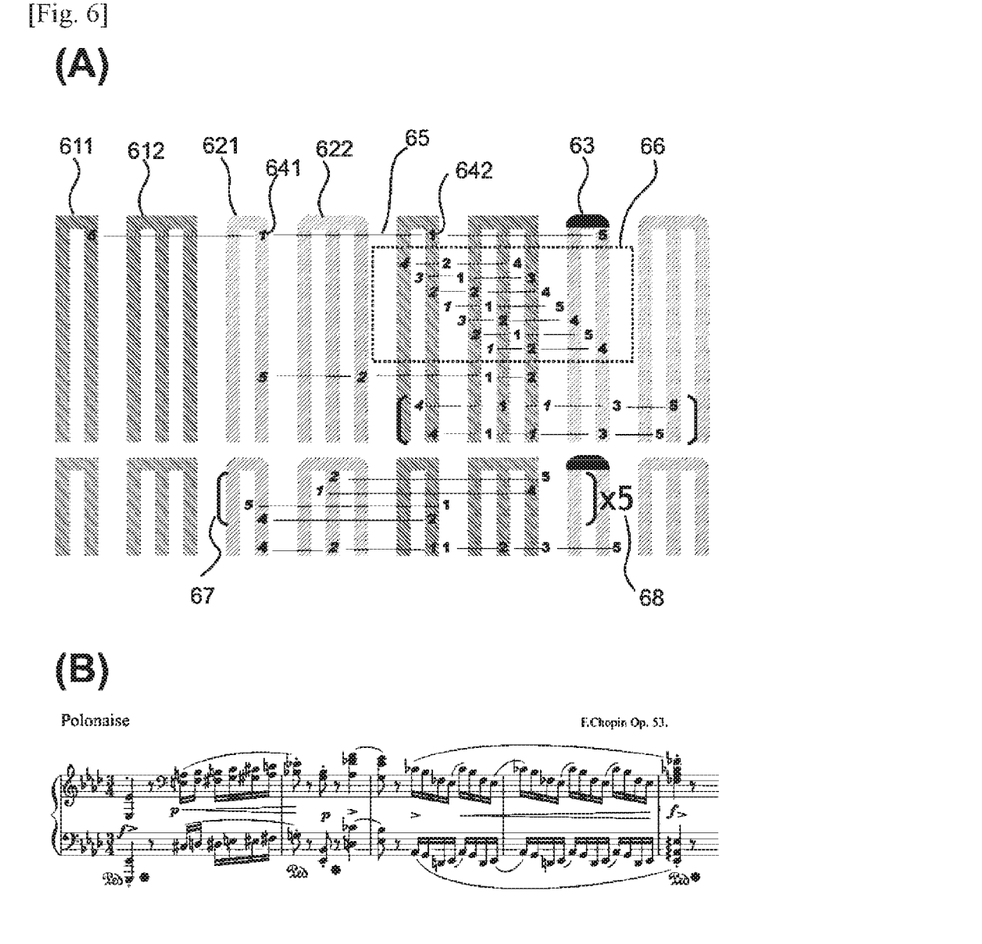
FIG. 6 is an example of sheet music in which a display device according to an embodiment of the present invention is used and corresponding staff notation.

FIG. 6(A) is an embodiment in which the present invention is also utilized to configure practice sheet music.

This embodiment is characterized in that sets containing a substantially n-shaped symbol and a substantially m-shaped symbol have different levels of gray scale and different shapes. Both the differences allow each octave to be visually distinct. Specifically, the set containing a deeply shaded, rectangular, substantially n-shaped symbol 611 and a deeply shaded, rectangular, substantially m-shaped symbol 612 and the set containing a slightly shaded, round top, substantially n-shaped symbol 621 and a slightly shaded, round top, substantially m-shaped symbol 622 are arranged by the number of times required for a pitch range of interest. In addition, with regard to a substantially n-shaped symbol 63 where the middle C is located, an upper portion of the symbol has another level of brightness and/or is painted with a different color, so that the symbol is visually distinguishable.

The substantially n-shaped and m-shaped marker symbols with the above features are arranged. Here, in the way of display, they are not arranged per bar, but they are arranged vertically as a unit of phrases desirable for making practice and memorizing sheet music. At this time, the length of the leg portions of the marker symbols is extended depending on the number of the pressed-key marks plotted thereon.

The sheet music of FIG. 6(A) as shown here provides the first part of the "Heroique Polonaise" composed by Chopin. Note value (the length of a note) information is omitted from the conventional staff sheet music shown in FIG. 6(B) to give play information in which only changes in patterns of the positions of pressed keys are selected. That is, FIG. 6(A) shows practice sheet music specialized in inputting the visual (spatial) memories of a keyboard.

In FIG. 6(A), finger numbers 1 to 5 allocated to the thumb to the little finger, respectively, are used as pressed-key marks for both the left and right hands. The light colored numerical characters written in italics are used as the pressed-key marks 641 for the left hand. The deep colored numerical characters written in a regular font are used as the pressed-key marks 642 for the right hand. Because the marks are expressed in such a manner, one can understand, at a glance, a state in which keys are pressed while the left and right fingers are being crossed. The order of the pressed-key marks (641 and 642) plotted on the bottom edge portion of the first marker symbols as shown in FIG. 6(A) is such an example. Note that the way of display of these pressed-key marks is not limited to this embodiment as long as the left and right hands are distinguishable. For instance, each finger number is represented by a circled number or a boxed number. This way makes it possible to distinguish the left hand form the right hand.

Tones generated simultaneously are displayed in substantially the same manner as for the sheet music of FIG. 5(A). The pressed-key marks are likewise connected using a horizontal auxiliary line 65 to emphasize that the tones are generated simultaneously.

Further, the sheet music of FIG. 6(A) is characterized in that a line box 66 and parentheses 67 are added to the phrase to be visually stressed as a series of movement. This can instruct learners that portions stressed using the line box and the parentheses should be practiced as a series of movement and then memorized. Also, a numerical character 68 indicating the number of repeats may be designated when these phrases are repeated. This can prevent the portion of the sheet music from being redundant, thereby capable of providing easy-to-memorize sheet music. In addition, an auxiliary line indicating a phrase segment may be added.

Here, in the sheet music shown in FIG. 6(A), information about note values and/or bars has been removed. Accordingly, this can efficiently make learners aware of the visual information about all the positions of pressed keys. When conventional staff notation is used for learning, the learners tend to make practice such that the positions of pressed keys are read from the staff notation and the fingering patterns read are preferentially fixed in their brain. As a result, the images of a keyboard are vague and thus unlikely to be memorized. However, an aspect of the present invention provides use of the sheet music having the substantially n-shaped and m-shaped black key markers. Consequently, the images of a keyboard are not imaged as a simple vague background, but as a core of the memory. In this way, the visual play memory is reinforced, so that it is easy to reproduce the playing image just in the brain. At this time, the three-dimensionally constructed learning tool according to the embodiment shown in FIG. 3, for example, is used in combination. Then, the spatial memory based on finger touches can be simultaneously input into their brain at their own will.

In such brain practice without using any keyboard instrument, the learners, by themselves, can retrieve tones. This should be the training of being actively aware of the connection between the keyboard and the tones. Then, the learners who have developed good ear based on the images of a keyboard "can understand a piece of music while looking only at the sheet music and then generating sounds in their own brain. This makes it possible to acquire the ability to play music in their brain at the first glance.

Figure 7:
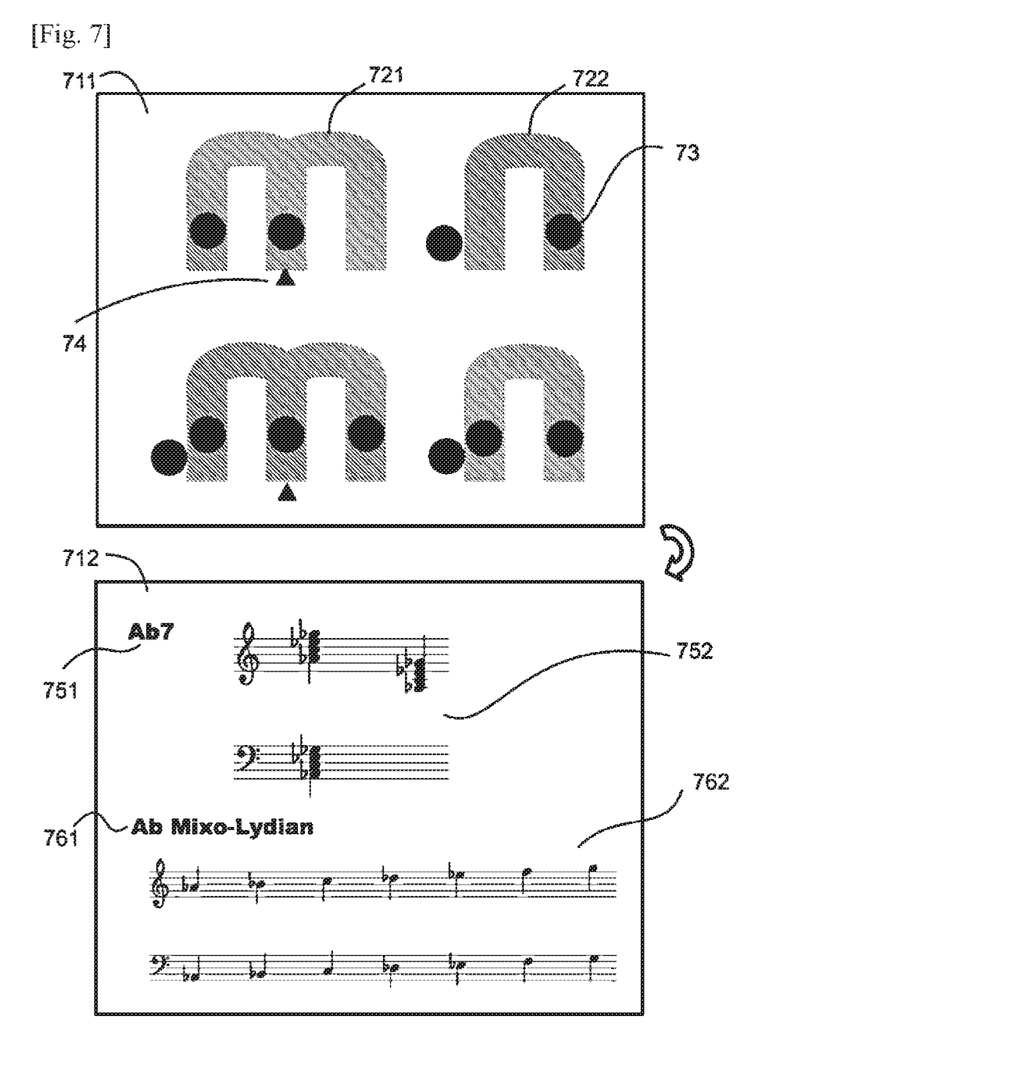
FIG. 7 is an example of a card that is a display device according to an embodiment of the present invention.

FIG. 7 shows both sides of a card when a display device according to the present invention is embodied as the card.

On the front face 711 of the card are used a substantially n-shaped symbol 722 and a substantially m-shaped symbol 721 with which black keys are diagrammed in accordance with the present invention. Pressed-key marks 73 are plotted at the positions of keys used to play a melody, chord, and/or scale. Further, when the pressed-key marks plotted indicate the chord and/or scale, the root of the chord and/or the key note of the scale are each represented by a triangle 74. Note that the shape of the pressed-key marks and/or the shape of the triangle as used herein are not limited to this embodiment.

Meanwhile, this embodiment is assumed to be put into practice as a paper print card, etc. The card may be put into practice using an electronic display device such as a personal computer and a tablet PC. Alternatively, the card may be put into practice using a display device such as a display panel part of an electronic keyboard instrument. It is needless to say that such display devices may be likewise put into practice using virtual cards in which the display of the card is switched from one side to the other side thereof by one-touch operation.

The pressed-key marks 73 shown in FIG. 7 may be plotted on black keys. In this case, their display positions on the black keys are a little higher than those on white keys. This way of display can create a visual difference. This difference corresponds to a difference in the height between white and black keys of actual keyboards. The purpose is to make learners instinctively aware of a finger state. Note that the difference in the height at which the pressed-key marks 73 are displayed may reflect the time course of a melody sequence in addition to the above-described example. Also, the difference may reflect a difference among chords built on "basic notes (1st, 3rd, and 5th scale degrees)", "(6th and 7th scale degrees)", and "other tension". Such use of the difference should be taken into consideration.

In connection with the positions of pressed keys as shown in the front face 711, the back face 712 of the card is provided with a chord name 751, a scale name 761, displays (752 and 762) in staff notation, and/or a note name.

Both the faces of this card can be each utilized as a learning card. The learners can look at the front face of the card and make practice to instantly retrieve the names and/or the notes in staff notation. In the other way around, the learners should make practice to instantly retrieve the images of keys pressed on the keyboard once they look at the chord name, scale name, and/or sheet music written on the back face of the card. Here, the term "instantly" is stressed because although a plurality of the positions of pressed keys are combined with the substantially n-shaped and m-shaped marker symbols according to the present invention, this combination allows the chord, scale, and melody to be visually grasped as a set having one or two symbols. Such pressed-key position patterns can be instantly burned into the eye. This pattern imaging training can not only lead to a significantly reduced time to learn a keyboard instrument, but also results in an effective learning strategy to deepen the understanding of the music theory regarding chords and scales.

A piece of card is herein shown as an embodiment. However, it is desirable to configure the card as a set containing cards regarding chords and/or scales, which cards are packaged in accordance with, for example, the respective levels of learners. Additionally, a piece of music that each learner wishes to master may be segmented. In such a manner, the card set may be configured so as to both memorize sheet music and study the theory. Of course, such a card set may also be configured as virtual cards for electronic devices such as a personal computer and a tablet PC. In addition, an interactive learning program may be added thereto.

INDUSTRIAL APPLICABILITY

A display device for practice of a keyboard instrument is provided such that black keys are diagrammed as markers in accordance with the present invention. The present invention makes it possible to easily teach learners, who cannot read conventional staff notation, how to play a keyboard instrument. Also, the present invention is effective in stably embedding images of a keyboard into the brain of each learner. Accordingly, the skills for reading and/or memorizing sheet music are improved remarkably. Besides, the present invention can provide the foundation for their ear sensitivity and musical theory education. Hence, the present invention can be widely used in the fields of music education and industries.

REFERENCE SIGNS LIST

11 Substantially n-shaped symbol illustrating two parallel black keys.
12 Substantially m-shaped symbol illustrating three parallel black keys.
23 Mark indicating the position of a pressed key
44 Panel
53 Mark indicating the middle C
541 Mark indicating the position of a key pressed using the left hand.
542 Mark indicating the position of a key pressed using the right hand
543 Mark indicating the continuation of a pressed key
641 Finger number indicating the position of a key pressed using the left hand
642 Finger number indicating the position of a key pressed using the right hand
711 Front face of a card
712 Back face of the card

The invention claimed is:

1. A display device for displaying, as markers, diagrammed black keys of a keyboard instrument, comprising:
   a substantially n-shaped symbol that is expressed as a marker for indicating positions of five keys of C, C#, D, D#, and E; and
   a substantially m-shaped symbol that is expressed as a marker for indicating positions of seven keys of F, F#, G, G#, A, A#, and B,
      wherein the substantially n-shaped symbol and the substantially m-shaped symbol are alternately arranged with an interval in accordance with an arrangement of black keys of a keyboard instrument to display a desired pitch range, and
      wherein the positions of pressed keys are each plotted on a leg portion of the n-shaped symbol or the m-shaped symbol or a ground portion adjacent to the leg portion.

2. The display device according to claim 1, wherein when the pitch range displayed by the display device exceeds one octave, octaves are differentially displayed such that sets, each constituting an octave and containing the substantially n-shaped symbol and the substantially m-shaped symbol, are displayed in two different colors and/or at different levels of gray scale and are arranged alternately, and
   wherein when the pitch range displayed by the display device includes a middle C, a mark may be added, next to the substantially n-shaped symbol, at a position of the middle C or a height, width, and/or design of the n-shaped symbol are modified and distinguishable.

3. The display device according to claim 1, wherein a pressed-key mark which indicates a position of a pressed black key and a pressed-key continuation mark which indicates that a state of the pressed black key continues are plotted on any of two lines each representing a leg portion of the substantially n-shaped symbol or on any of three lines each representing a leg portion of the substantially m-shaped symbol;
   a pressed-key mark which indicates a position of a pressed white key and a pressed-key continuation mark which indicates that a state of the pressed white key continue are plotted on a ground portion adjacent to the leg portion;
   the pressed-key marks are expressed as symbols, numerical characters, or marks, a display style of which is different between a left hand and a right hand;
   a length of the leg portions of the substantially n-shaped symbol or the substantially m-shaped symbol is extended depending on the number of the pressed-key marks plotted;
   a connection line which stresses that keys are pressed simultaneously and/or an auxiliary line which stresses a flow of a phrase are added; and
   a symbol element, such as a segment line, parentheses, and a line box, for visually indicating a phrase segment and/or an assembly of phrases is added.

4. A card and a set containing the card using the display device according to claim 1, comprising:
   a card on which black keys are diagrammed as markers in accordance with the display device,
   wherein a position of a key pressed on a keyboard is displayed on a front face of the card;
   and a note name, chord name, scale name, and/or sheet music, for example, that correspond to the display on the front face of the card are displayed on a back face of the card.

5. A method for practice of a keyboard instrument, comprising:
   using a display device for displaying a keyboard image in which black keys of a keyboard instrument are diagrammed as markers,
   wherein the display device is the display device according to claim 1.

* * * * *